United States Patent
Jin et al.

(10) Patent No.: US 9,087,390 B2
(45) Date of Patent: Jul. 21, 2015

(54) HIGH-QUALITY UPSCALING OF AN IMAGE SEQUENCE

(75) Inventors: Hailin Jin, San Jose, CA (US); Alper Ayvaci, Los Angeles, CA (US); Zhe Lin, Fremont, CA (US); Scott D. Cohen, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 211 days.

(21) Appl. No.: 13/481,477

(22) Filed: May 25, 2012

(65) Prior Publication Data

US 2013/0071040 A1     Mar. 21, 2013

Related U.S. Application Data

(60) Provisional application No. 61/535,777, filed on Sep. 16, 2011.

(51) Int. Cl.
*G06K 9/40* (2006.01)
*G06T 3/40* (2006.01)

(52) U.S. Cl.
CPC .............. *G06T 3/4053* (2013.01); *G06T 3/4076* (2013.01)

(58) Field of Classification Search
CPC .................................................... G06T 3/4076
See application file for complete search history.

(56) References Cited

U.S. PATENT DOCUMENTS

| | | | |
|---|---|---|---|
| 6,646,655 B1 | 11/2003 | Brandt et al. | |
| 7,587,099 B2 | 9/2009 | Szeliski et al. | |
| 7,746,382 B2 | 6/2010 | Soupliotis et al. | |
| 2004/0218834 A1* | 11/2004 | Bishop et al. | 382/299 |
| 2006/0083440 A1* | 4/2006 | Chen | 382/284 |
| 2009/0110285 A1* | 4/2009 | Elad et al. | 382/190 |
| 2009/0257684 A1* | 10/2009 | Liu | 382/299 |
| 2010/0061638 A1* | 3/2010 | Tanaka | 382/199 |
| 2012/0328210 A1* | 12/2012 | Fattal et al. | 382/264 |

OTHER PUBLICATIONS

Gupta, A., Bhat, P., Dontcheva, M., Deussen, O., Curless, B., and Cohen, M., Enhancing and Experiencing Spacetime Resolution with Videos and Stills, 2009, IEEE International Conference on Computational Photography, pp. 1-9.*
Ancuti, C., Ancuti, C.O., and Bekaert, P., A Patch-Based Approach to Restore Videos Using Additional Stills, Sep. 15-17, 2010, 52nd International Symposium ELMAR-2010, pp. 143-146.*
Bishop, C.M., Blake, A., and Marthi, B., Super-resolution Enhancement of Video, 2003, Proc. Artificial Intelligence and Statistics, vol. 2, pp. 1-7.*
Shi, J. and Malik, J., Motion Segmentation and Tracking Using Normalized Cuts, 1998, Sixth International Conference on Computer Vision, pp. 1154-1160.*
U.S. Appl. No. 13/481,491, filed May 25, 2012, Hailin Jin et al.

* cited by examiner

*Primary Examiner* — Stephen R Koziol
*Assistant Examiner* — Jonathan S Lee
(74) *Attorney, Agent, or Firm* — Wolfe-SBMC

(57) ABSTRACT

A method, system, and computer-readable storage medium are disclosed for upscaling an image sequence. An upsampled frame is generated based on an original frame in an original image sequence comprising a plurality of frames. A smoothed image sequence is generated based on the original image sequence. A plurality of patches are determined in the upsampled frame. Each patch comprises a subset of image data in the upsampled frame. Locations of a plurality of corresponding patches are determined in a neighboring set of the plurality of frames in the smoothed image sequence. A plurality of high-frequency patches are generated. Each high-frequency patch is based on image data at the locations of the corresponding patches in the original image sequence. The plurality of high-frequency patches are added to the upsampled frame to generate a high-quality upscaled frame.

20 Claims, 10 Drawing Sheets

HIGH-QUALITY UPSCALING OF AN IMAGE SEQUENCE

PRIORITY INFORMATION

This application claims benefit of priority of U.S. Provisional Application Ser. No. 61/535,777 entitled "High-Quality Denoising and Upscaling of an Image Sequence" filed Sep. 16, 2011, the content of which is incorporated by reference herein in its entirety.

BACKGROUND

1. Field of the Invention

The present invention is directed to computer systems; and more particularly, it is directed to the processing of digital images.

2. Description of the Related Art

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Digital image processing is the process of analyzing and/or modifying digital images using a computing device, e.g., a computer system. Using specialized software programs, digital images may be manipulated and transformed in a variety of ways. For example, image scaling is the process of resizing a digital image. Scaling is a process that involves trade-offs among computational efficiency, image smoothness, and image sharpness. As the size of an image is increased, the pixels in the image become increasingly visible, making the image appear "soft." Conversely, reducing the image in size will tend to enhance its smoothness and apparent sharpness.

Single image super-resolution or image upscaling is the technique of generating a high-resolution image from a low-resolution input. An image upscaling process may predict a relatively large number of unknown pixel values based on a relatively small number of input pixels. Conventional approaches to the problem of upscaling may thus depend on the quality of available models referred to as image priors. The image priors used by conventional approaches tend to range from simple "smoothness" priors to more sophisticated statistical priors learned from natural images. For conventional approaches to image upscaling, the most popular and simplest methods are those based on analytical interpolations, e.g., a bicubic or bilinear interpolation with an analytical "smoothness" assumption.

The process of upscaling an image may introduce noise or magnify the existing noise in the image. Image denoising is the technique of removing noise from an image.

SUMMARY

Various embodiments of systems, methods, and computer-readable storage media for upscaling an image sequence are disclosed. An upsampled frame may be generated based on an original frame in an original image sequence. The original image sequence may comprise a plurality of frames, typically ordered for playback as animation or video. A smoothed image sequence may be generated based on the original image sequence. A plurality of patches may be determined in the upsampled frame. Each of the plurality of patches comprises a subset of image data in the upsampled frame. For example, each patch may comprise a contiguous set of pixels taken from a particular portion of the upsampled frame. Locations of a plurality of corresponding patches may be determined in the corresponding frame or a neighboring set of the plurality of frames in the smoothed image sequence. In other words, each of the patches may be matched to a corresponding portion of one or more other frames that are close to the upsampled frame (e.g., within a threshold number of frames before and/or after the upsampled frame) in the image sequence.

A plurality of high-frequency patches may be generated. Each high-frequency patch may be based on image data at the locations of the corresponding patches in the original image sequence. The plurality of high-frequency patches may be added to the upsampled frame to generate a high-quality upscaled frame. In this manner, the quality of the upsampled frame may be improved by using image data from the corresponding frame or neighboring frames in the smoothed image sequence.

Figure 1:
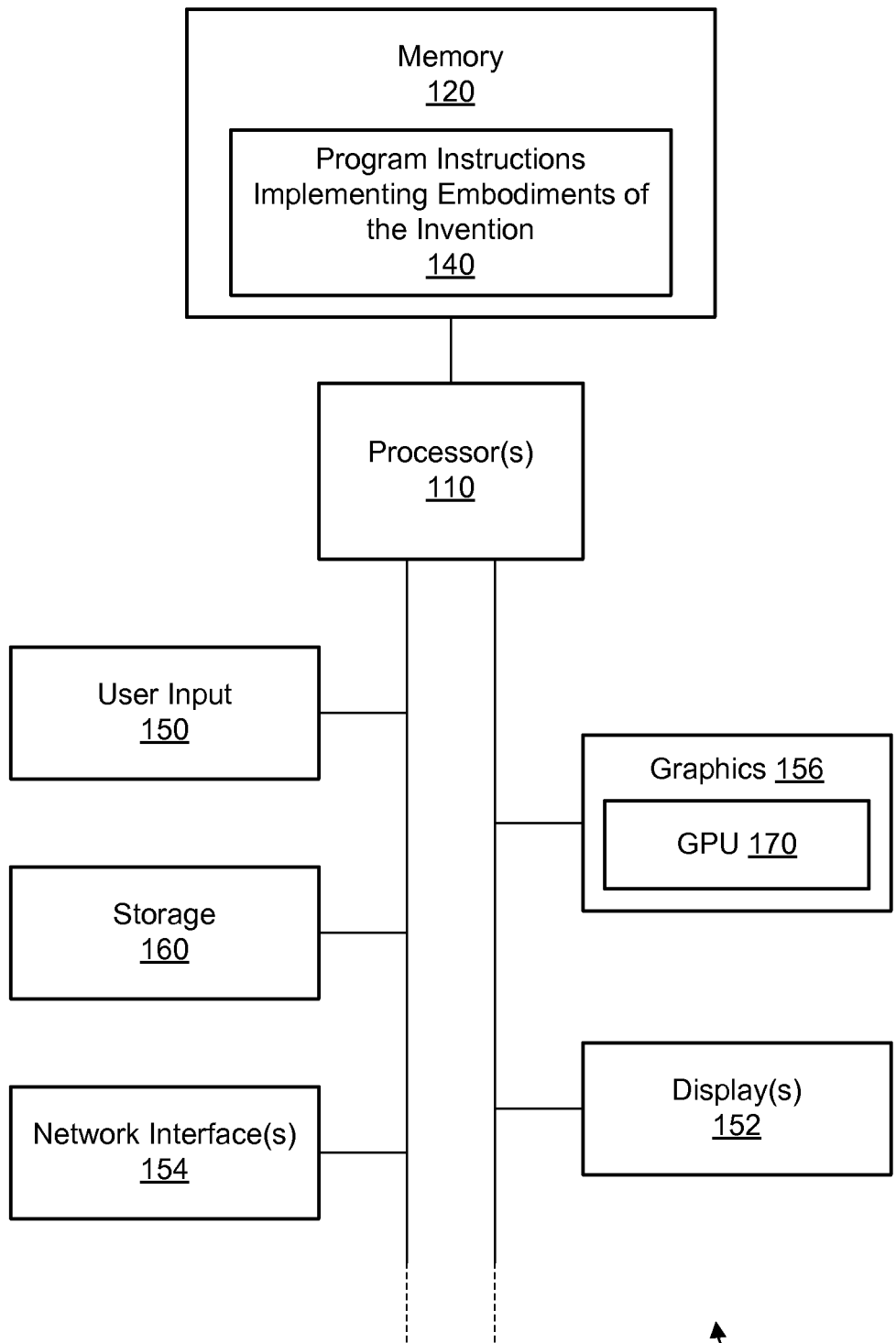
FIG. 1 is a block diagram of an example system configured to implement embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the systems and methods described herein may be used to perform upscaling and/or denoising in an image sequence. FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Figure 2A:
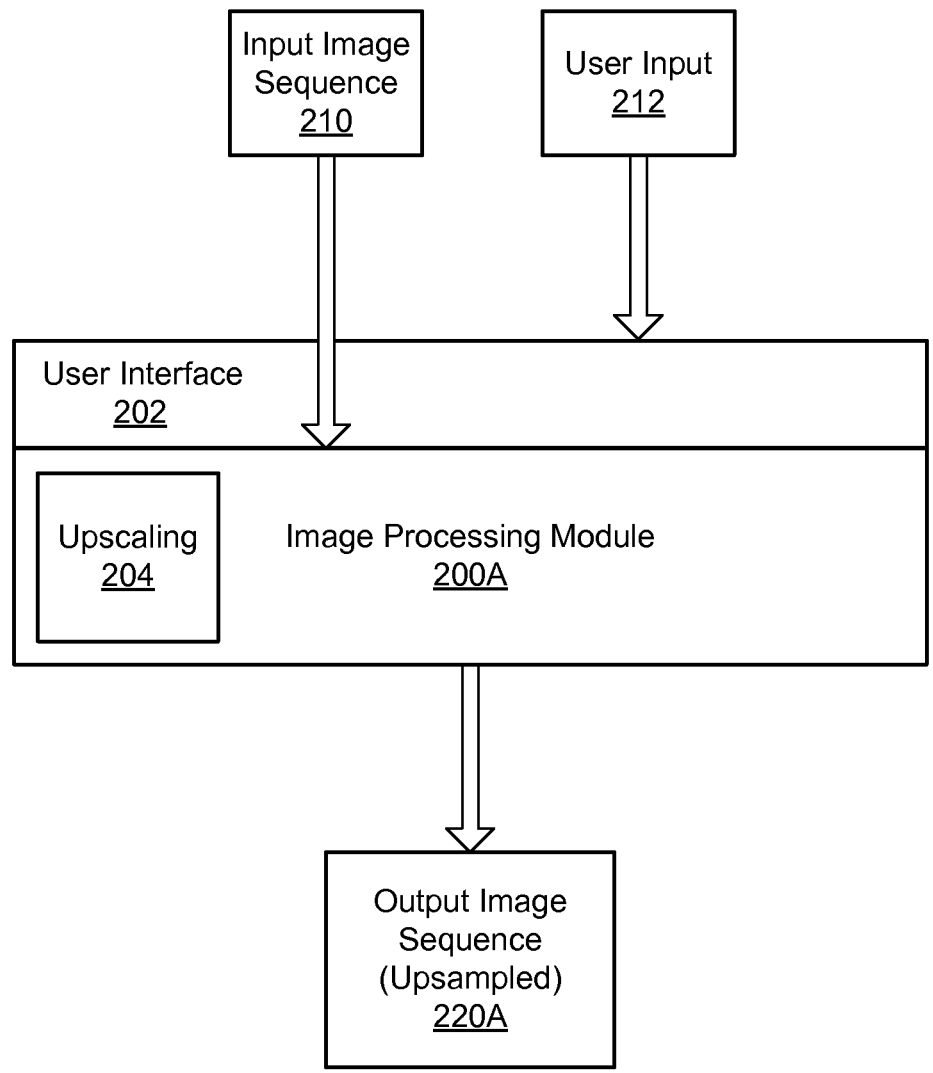
FIG. 2A illustrates an example of an image processing module configured for upscaling an image sequence, according to one embodiment.

FIG. 2A illustrates an example of an image processing module 200A that may implement embodiments of methods for upscaling an image sequence, according to one embodiment. In one embodiment, module 200A may provide a user interface 202 that includes one or more user interface elements via which a user may initiate, interact with, direct, and/or control the methods performed by module 200A. Module 200A may obtain at least one image sequence 210 as input. The image sequence 210 may include a plurality of digital images in a sequence such as in a video sequence. In one embodiment, module 200A may also obtain user input 212, such as one or more instructions to perform any of the methods for upscaling an image sequence. In various embodiments, the upscaling methods may be initiated by user input, by a configuration of the image processing module 200A itself (i.e., automatically initiated), or by one or more instructions received by the image processing module 200A from another module.

As will be described below in greater detail, upscaling techniques may be applied to the image sequence 210. An upscaling module 204 may be used to perform an upscaling technique (also referred to herein as an upsampling technique or a super-resolution technique) on the image sequence 210. In one embodiment, the process performed by the upscaling module 204 may be performed automatically and/or programmatically. The module 200A may produce an output image sequence 220A that has been upsampled using the techniques described herein.

Figure 2B:
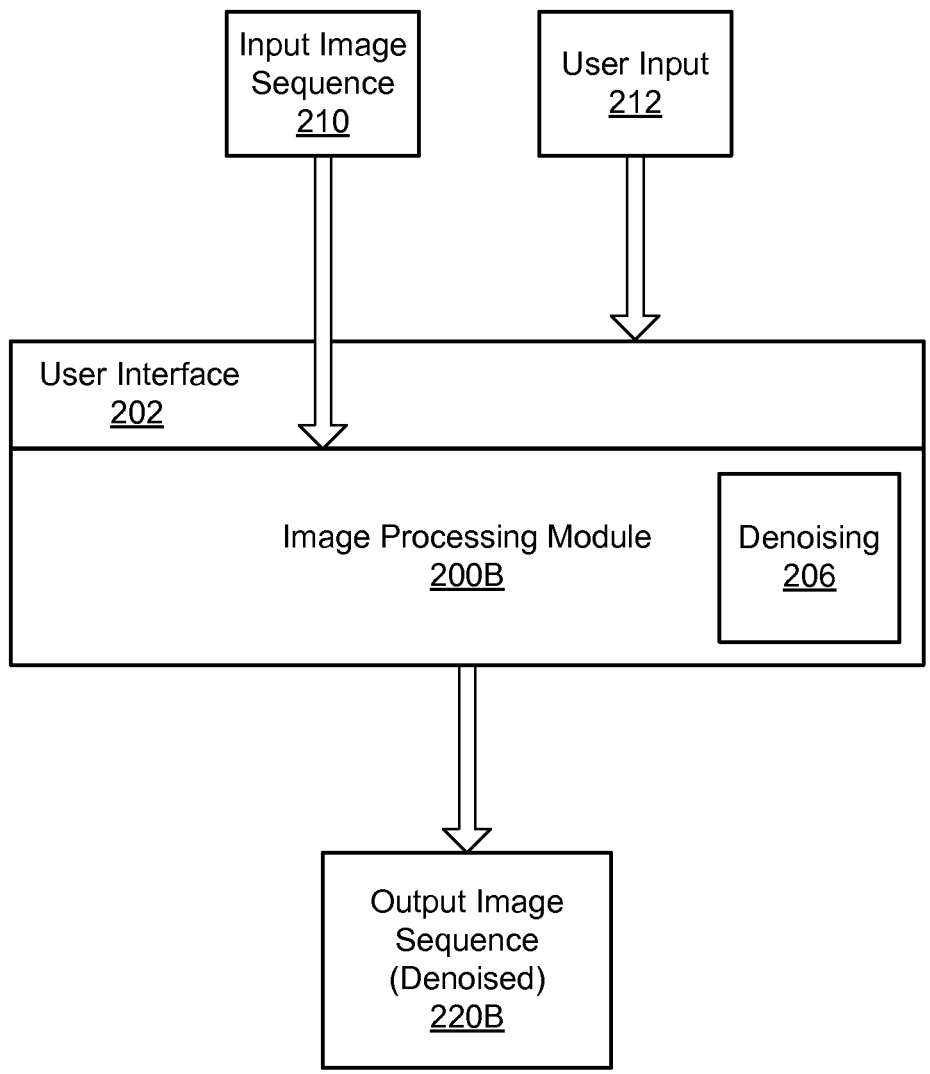
FIG. 2B illustrates an example of an image processing module configured for denoising an image sequence, according to one embodiment.

FIG. 2B illustrates an example of an image processing module 200B that may implement embodiments of methods for denoising an image sequence, according to one embodiment. In one embodiment, module 200B may provide a user interface 202 that includes one or more user interface elements via which a user may initiate, interact with, direct, and/or control the methods performed by module 200B. Module 200B may obtain at least one image sequence 210 as input. The image sequence 210 may include a plurality of digital images in a sequence such as in a video sequence. In one embodiment, module 200B may also obtain user input 212, such as one or more instructions to perform any of the methods for denoising an image sequence. In various embodiments, the denoising methods may be initiated by user input, by a configuration of the image processing module 200B itself (i.e., automatically initiated), or by one or more instructions received by the image processing module 200B from another module.

As will be described below in greater detail, denoising techniques may be applied to the image sequence 210. A denoising module 206 may be used to perform a denoising technique on the image sequence 210. In one embodiment, the process performed by the denoising module 206 may be performed automatically and/or programmatically. The module 200B may produce an output image sequence 220B that has been denoised using the techniques described herein.

Figure 2C:
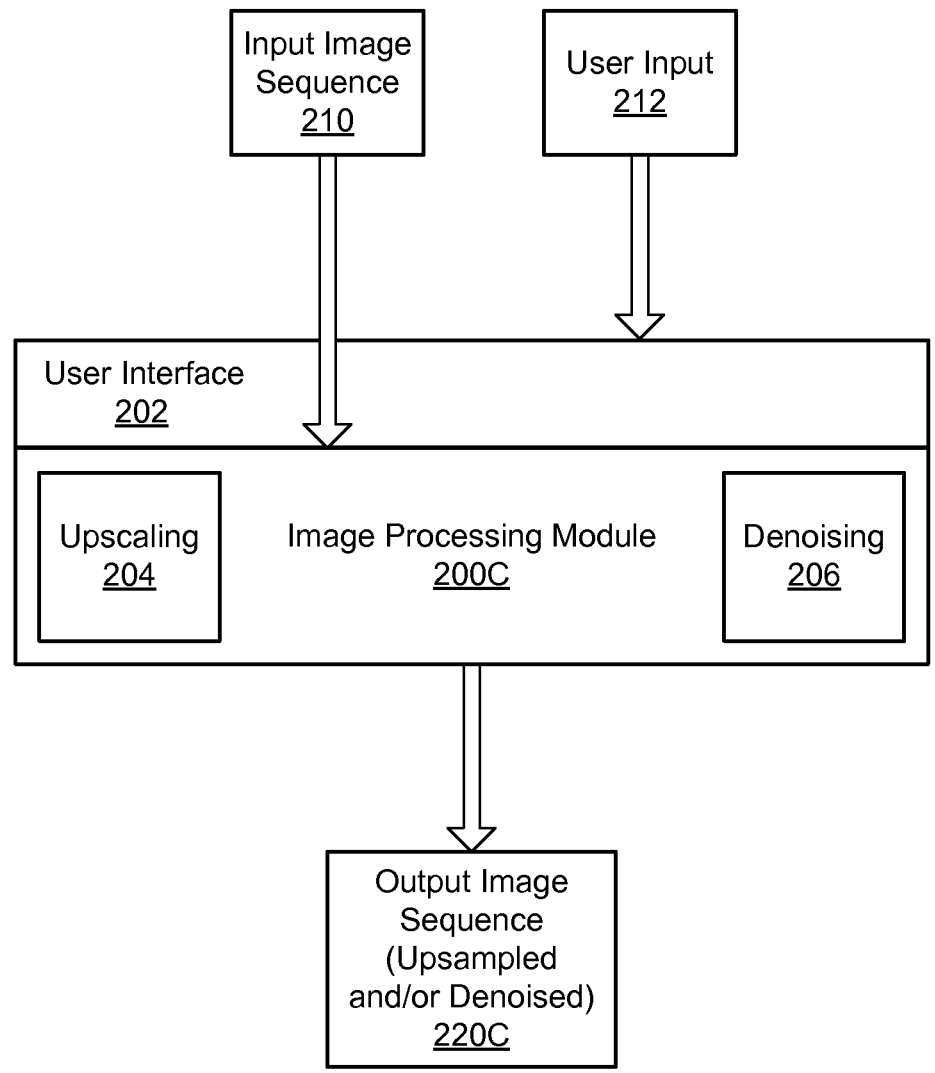
FIG. 2C illustrates an example of an image processing module configured for upscaling and/or denoising an image sequence, according to one embodiment.

FIG. 2C illustrates an example of an image processing module 200C that may implement embodiments of methods for upscaling and/or denoising an image sequence, according to one embodiment. In one embodiment, module 200C may provide a user interface 202 that includes one or more user interface elements via which a user may initiate, interact with, direct, and/or control the methods performed by module 200C. Module 200C may obtain at least one image sequence 210 as input. The image sequence 210 may include a plurality of digital images in a sequence such as in a video sequence. In one embodiment, module 200C may also obtain user input 212, such as one or more instructions to perform methods for upscaling and/or denoising an image sequence. In various embodiments, the upscaling and/or denoising methods may be initiated by user input, by a configuration of the image processing module 200C itself (i.e., automatically initiated), or by one or more instructions received by the image processing module 200C from another module.

As will be described below in greater detail, upscaling and/or denoising techniques may be applied to the image sequence 210. The upscaling module 204 may be used to perform an upscaling technique, and the denoising module 206 may be used to perform a denoising technique. In one embodiment, the process performed by the upscaling module 204 may be performed automatically and/or programmatically. In one embodiment, the process performed by the denoising module 206 may be performed automatically and/or programmatically. The module 200C may produce an output image sequence 220C that has been upsampled and/or denoised using the techniques described herein.

Image processing module 200A, 200B, or 200C may be implemented as or in a stand-alone application or as a module of or plug-in for an image processing and/or presentation application. Examples of types of applications in which embodiments of module 200A, 200B, or 200C may be implemented may include, but are not limited to, image editing, processing, and/or presentation applications, as well as applications in security or defense, educational, scientific, medical, publishing, digital photography, digital films, games, animation, marketing, and/or other applications in which digital video image editing or presentation may be performed, e.g., where operations are to be directed to different layers of images. Specific examples of applications in which embodiments may be implemented include, but are not limited to, Adobe® Photoshop® and Adobe® Illustrator®. In addition to generating output image sequence 220A, 220B, or 220C, module 200A, 200B, or 200C may be used to display, manipulate, modify, and/or store the output images, such as to a memory medium such as a storage device or storage medium.

Techniques for upscaling and/or denoising as described herein may be used to obtain a high-quality image from a video or other image sequence. A high-quality image may comprise an image with higher resolution and lower noise. Patch-based techniques may be used for video denoising and image super-resolution. To avoid introducing blur in the video denoising process, an image super-resolution technique may be combined with a video denoising technique in a single process. The joint upscaling/denoising solution may outperform single-image super-resolution techniques on videos with significant noise.

Video resolution in most consumer-grade cameras is not sufficient for producing high-quality large prints. In many consumer-grade cameras, the highest video resolution is typically 1920 pixels by 1080 pixels. The 1920×1080 resolution may be sufficient for smaller prints (e.g., 5-by-7 inch prints) but insufficient for larger prints. To obtain images of higher resolutions, the temporal coherency in video may be exploited: that is, an object present in one image in an image sequence is often present in neighboring images as well. If the pixel correspondence relationship among the frames in an image sequence is known, then multiple instances of the same object (i.e., obtained from different frames) may be combined to obtain an improved version of the same object. As described herein, pixel-wise motion information may be obtained by applying an optical flow algorithm.

Figure 3:
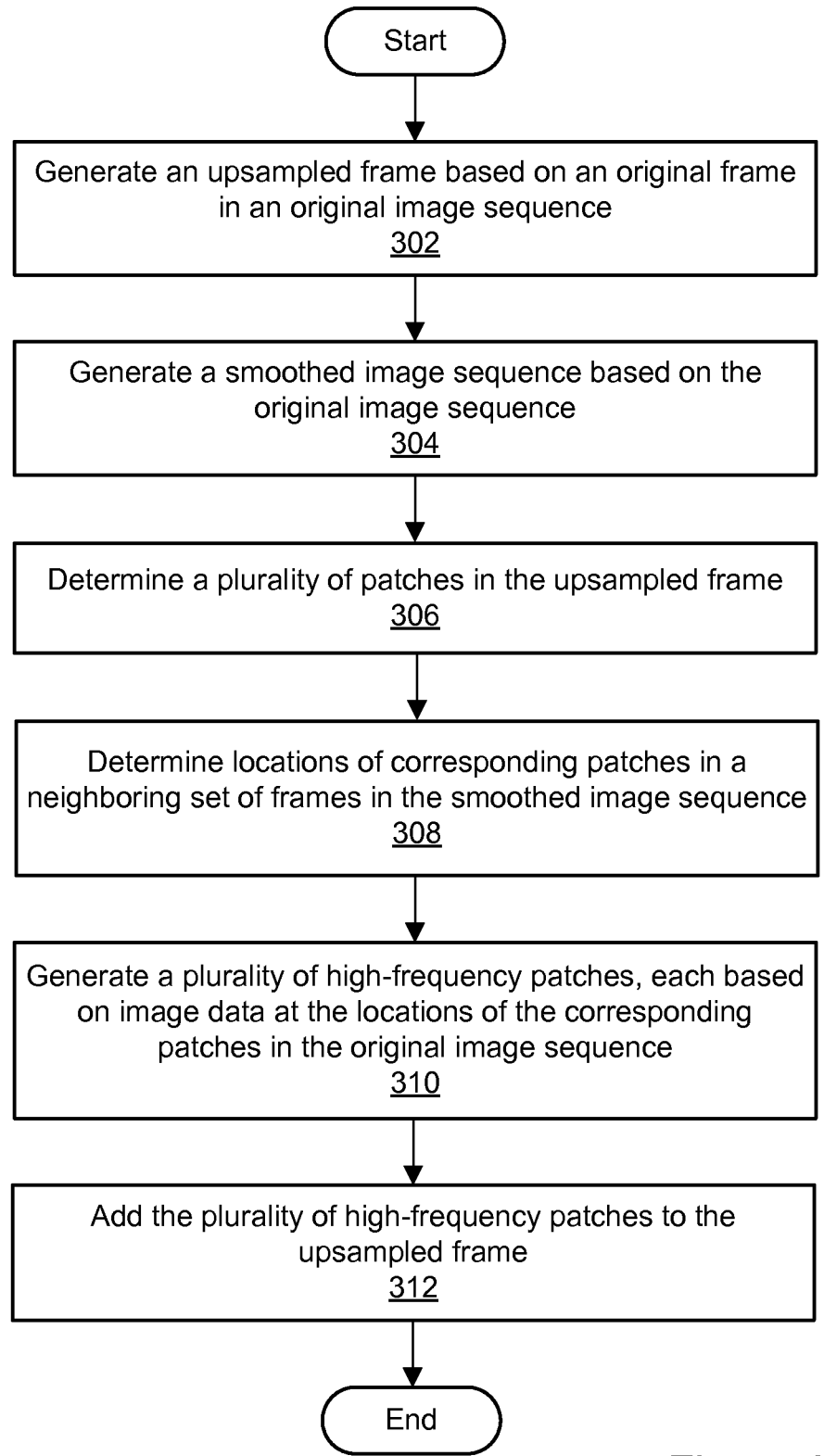
FIG. 3 is a flowchart illustrating a method for super-resolution of an image sequence, according to one embodiment.

FIG. 3 is a flowchart illustrating a method for upscaling an image sequence, according to one embodiment. The method shown in FIG. 3 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in block 302, an upsampled frame may be generated based on an original frame in an original image sequence. The original image sequence may comprise a plurality of frames, typically ordered for playback as animation or video. The upsampled frame may comprise a version of an original frame from the original image sequence that has been increased in resolution. The upsampled frame may be generated using any suitable technique for upscaling or upsampling the original frame. As shown in block 304, a smoothed image sequence may be generated based on the original image sequence. The smoothed image sequence may comprise a version of the original image sequence in which a plurality of the original frames have been subjected to a smoothing algorithm to remove noise.

As shown in block 306, a plurality of patches may be determined in the upsampled frame. Each of the plurality of patches comprises a subset of image data in the upsampled frame. For example, each patch may comprise a contiguous set of pixels taken from a particular portion of the upsampled frame. As shown in block 308, locations of a plurality of corresponding patches may be determined in a neighboring set of the plurality of frames in the smoothed image sequence. In other words, each of the patches may be matched to a corresponding portion of one or more other frames that are close to the upsampled frame (e.g., within a threshold number of frames before and/or after the upsampled frame) in the image sequence.

As shown in block 310, a plurality of high-frequency patches may be generated. Each high-frequency patch may be based on image data at the locations of the corresponding patches in the original image sequence. As shown in block 312, the plurality of high-frequency patches may be added to the upsampled frame to generate a high-quality upscaled frame. In this manner, the quality of the upsampled frame may be improved by using image data from neighboring frames in the image sequence. The operations shown in blocks 302-312 are discussed in greater detail below.

Figure 4:
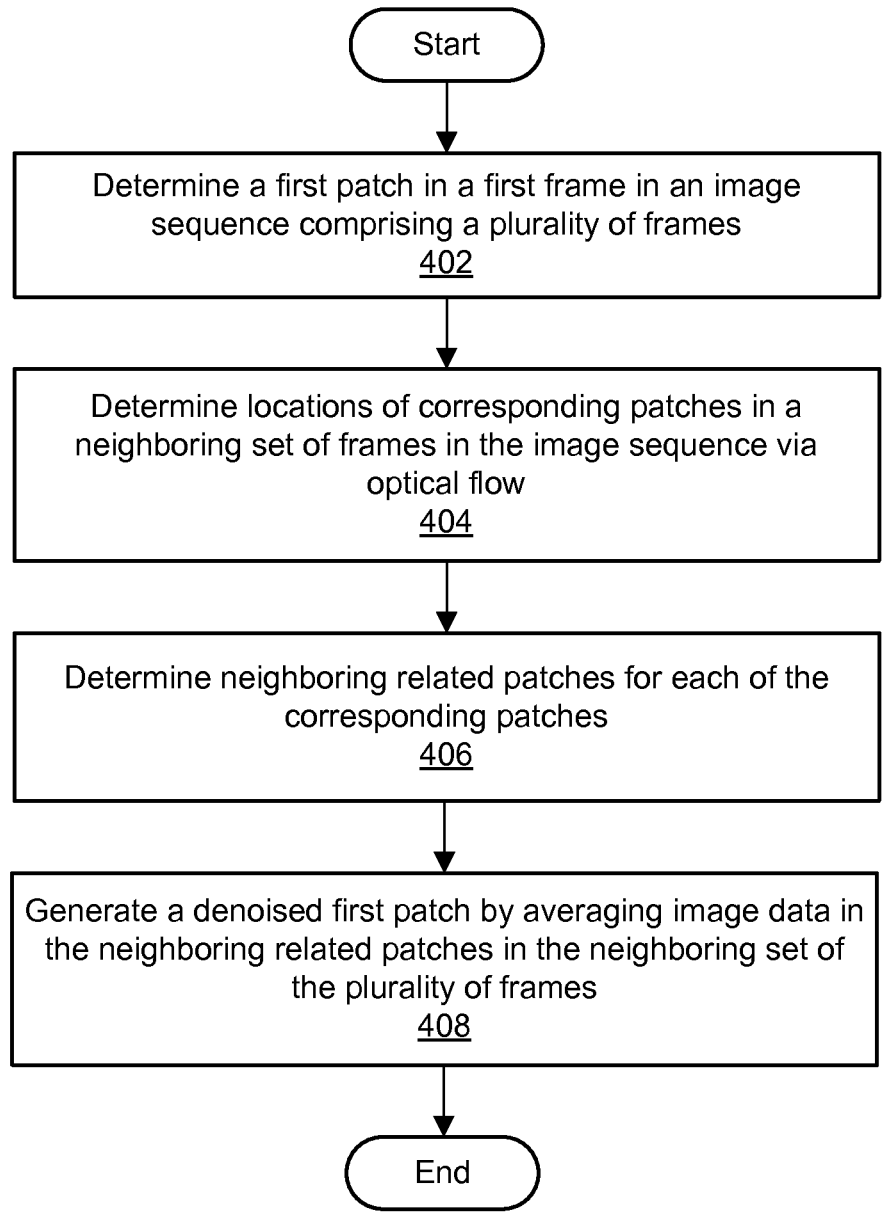
FIG. 4 is a flowchart illustrating a method for denoising an image sequence, according to one embodiment.

FIG. 4 is a flowchart illustrating a method for denoising an image sequence, according to one embodiment. The method shown in FIG. 4 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in block 402, a first patch may be determined in a first frame in an image sequence. The image sequence may comprise a plurality of frames, typically ordered for playback as animation or video. The first frame may occur at any point in the image sequence, such as in the middle of the image sequence. The first patch may comprise a subset of image data in the first frame. For example, the first patch may comprise a contiguous set of pixels taken from a particular portion of the frame.

As shown in block 404, locations of a plurality of corresponding patches may be determined in a neighboring set of the plurality of frames in the image sequence. In other words, the first patch may be matched to a corresponding portion of one or more other frames that are close to the first frame (e.g., within a threshold number of frames before and/or after the first frame) in the image sequence. In one embodiment, the corresponding patches may be determined via optical flow. As shown in block 406, one or more neighboring related patches may be determined for each of the plurality of corresponding patches. Each of the neighboring related patches may be located in the neighborhood of one of the corresponding patches and in the same frame. As shown in block 408, a denoised first patch may be generated by averaging image data in the one or more neighboring related patches in the neighboring set of the plurality of frames. The denoised first patch may be substituted for the original first patch in the first frame. A denoised image sequence may be generated by generating a plurality of denoised patches for each of the plurality of frames in the same manner. By using related image data from neighboring frames, the noise in the image sequence may be reduced.

In one embodiment, aspects of the upscaling technique illustrated in FIG. 3 may be combined with aspects of the denoising technique illustrated in FIG. 4. For example, as shown in FIG. 4, the denoising technique may first be applied to the image sequence. The upscaling technique may then be applied to the denoised image sequence, including generating the high-frequency patches based on the original image sequence rather than the denoised image sequence.

Image noise is often statistically independent among adjacent images. By using motion information calculated by optical flow, statistically independent noise may be removed from multiple instances of the same object. Video denoising techniques using such an approach are described herein. In various embodiments, the video denoising techniques (including the joint upscaling and denoising techniques) described herein may yield the following advantages. To increase the speed of the video denoising, an exact k-nearest neighbor search may search only within a local neighborhood. Furthermore, an occlusion map obtained from an optical flow estimation may be used to eliminate the effect of spurious query patches. In this manner, the risk of averaging non-related patches (e.g., due to incorrect motion estimation) together, thereby generating more accurate denoising effects, may be effectively reduced. Additionally, the denoising parameter α may be determined based on local noise estimation instead of global noise estimation. Specifically, the parameter σ (used to average patches) may be set proportional to the noise level estimated from each image location. Such an adaptive noise removal scheme may produce a more accurate result. Moreover, instead of scanning a large local neighborhood in order to handle strong noise, the size of the search window may be set as proportional to the noise level (or equivalently to σ) or the gradient content of the query patch. In one embodiment, this adaptive scheme is capable of removing strong noise, preserving the original image content, and making the algorithm computationally more efficient.

In various embodiments, the upscaling techniques (including the joint upscaling and denoising techniques) described herein may yield the following advantages. The upscaling may be performed in a unified, local patch self-similarity-based framework. Information from multiple neighboring frames may be combined in the patch-based framework. Self-similarity both within and across frames may be explored simultaneously to leverage all available information in the other frames. In contrast to example-based methods, the upscaling techniques described herein may be based on patch self-similarity within the input video itself. In contrast to the classic multiple image super-resolution approaches, the upscaling techniques described herein may be patch-based. In contrast to the patch-based self-similarity single image algorithms, the upscaling techniques described herein may merge information from multiple frames to super-resolve the reference frame instead of only relying on self-similarity within a single image. In contrast to example-based approaches, the upscaling techniques described herein may be performed without an off-line learning phase.

In contrast to the non-local means-based super-resolution algorithm for video, the upscaling techniques described herein may be performed without a post de-blur step in order to obtain a sharp resulting image and perform better in handling videos with large motions. In contrast to the space-time patch based approach, the upscaling techniques described herein may have the "de-noising" component interleaved with the upscaling process. In contrast to a Bayesian MAP framework, the upscaling techniques described herein may be more efficient due to the local patch search and self-similarity-based scheme. In contrast to a kernel regression-based method, the upscaling techniques described herein may yield more accurate results due to exact sub-pixel motion estimation with reliable optical flow and occlusion map estimation. Additionally, the upscaling techniques described herein may be more efficient due to the local patch search, and self-similarity-based scheme. In contrast to most prior approaches for example-based super-resolution (e.g., techniques which paste the high frequency band from a single NN patch), the upscaling techniques described herein may estimate the high frequency band as a weighted combination from k nearest neighbor patches.

To handle strong noise inputs, the joint upscaling and denoising techniques described herein may use patches from the de-noised frames as the source for finding similar patches but return to the original frames to compute high frequency components. In one embodiment, only the center frame may be denoised instead of all neighboring frames for the sake of efficiency. The results may be very similar, especially when a robust patch similarity measure (e.g., robust norm) is used.

Motion estimation based on an optical flow analysis may be used to find self-similar examples from other frames for upscaling, thereby allowing the techniques to find corresponding patches from other frames very efficiently with a local search. Optical flow may be used to define the neighborhood in the next frame to search, but k-NN patches may be searched with respect to the patch from the center frame but not the patch estimated by flow vector in neighboring frames. In this manner, the risk of error propagation from patches in other frames may be reduced. However, the upscaling and/or denoising techniques described herein may be implemented using any suitable optical flow algorithm.

The upscaling and/or denoising techniques described herein may use an occlusion map in finding self-similar patches to reduce potential artifacts caused by errors in motion estimation. In one embodiment, the occlusion map may be provided as input from an external algorithm, such as the same algorithm that computed the optical flow. If no occlusion map is provided as input, an occlusion map may be derived from the optical flow, e.g., by thresholding the residual image or checking the consistency of forward and backward flows.

In one embodiment, multiple-frame super-resolution techniques may be used for the initial upscaling iteration, and single-image super-resolution techniques may be used for the subsequent iterations. Instead of directly pasting the high-frequency band from nearest neighbor examples, the upscaling and/or denoising techniques described herein may perform a sub-pixel alignment for k-nearest neighbor patches for obtaining more accurate high frequency content to add to the low-frequency band. A sparsity prior may be used on the high frequency elements (e.g., $\lambda \|H_i\|_{L1}$) to regularize the result; the sparsity prior may be useful in removing residual noise.

A robust norm may be used to compare patches (e.g., sum of truncated square distances). The robust norm may help in handling large non-Gaussian (salt-and-pepper) noise, and it may be especially useful when computing distances between a de-noised source patch and noisy example patches. In one embodiment, de-noising may be performed only at the first iteration of the iterative up-scaling process, and each frame of a video may be upscaled sequentially to obtain a video super-resolution result. The benefit of using multiple frames for upscaling each frame may still be obtained, in contrast to a naïve approach of treating each frame independently and using a single-image algorithm on each frame.

Figure 5:
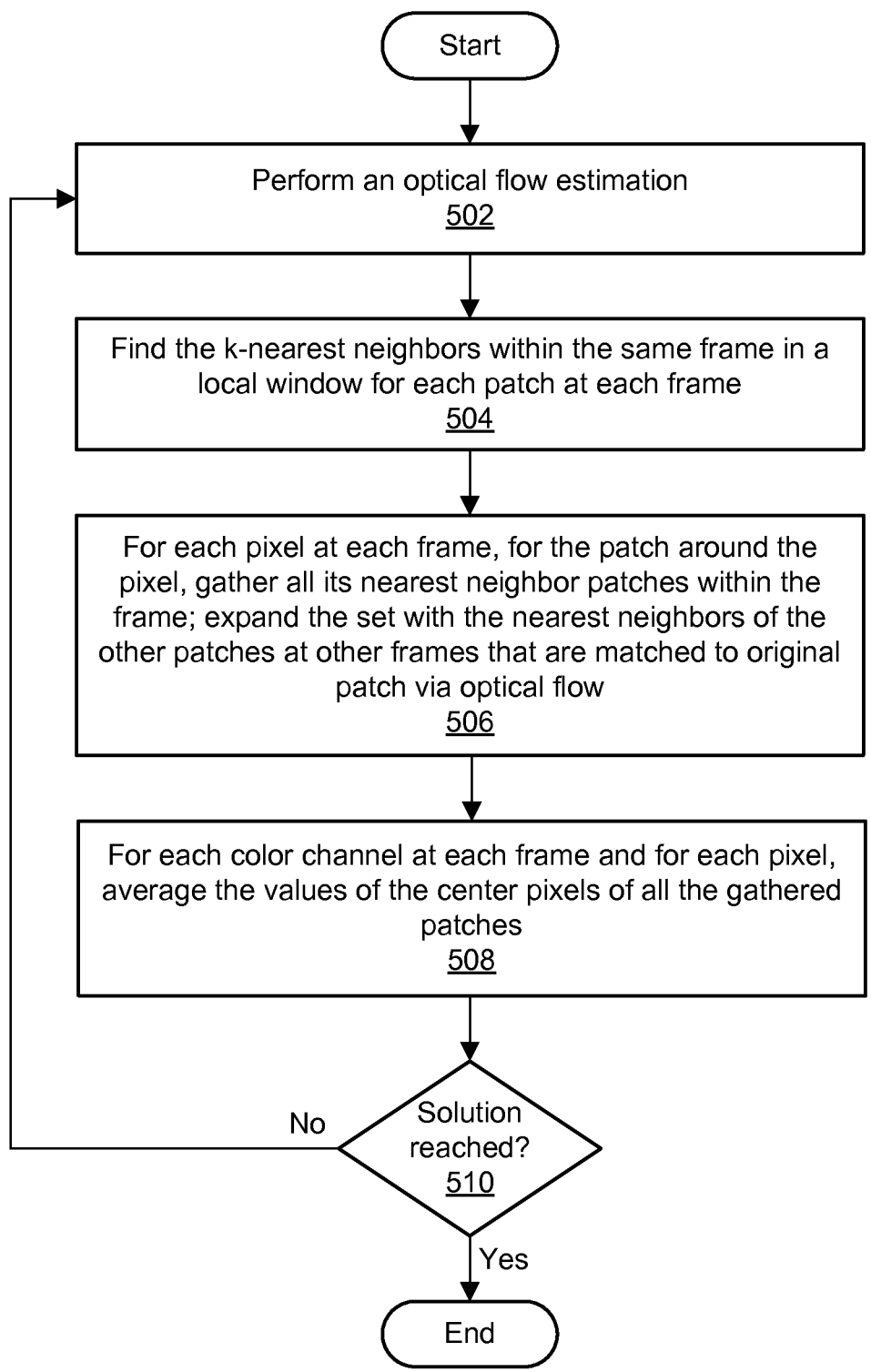
FIG. 5 is a flowchart illustrating further aspects of a method for denoising an image sequence, according to one embodiment.

FIG. 5 is a flowchart illustrating further aspects of a method for denoising an image sequence, according to one embodiment. The method shown in FIG. 5 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

The method illustrated in FIG. 5 may be used to perform video denoising for an image sequence with frames 1 ... T. As shown in 502, an optical flow estimation may be performed. In one embodiment, the optical flow estimation may be performed using the following four steps. First, for each frame 2 ... T−1, the optical flow may be estimated for the forward (t to t+1) and backward (t to t−1) optical flows. Second, the optical flows may be aggregated between frames to find the optical flow from any frame t to another one t'. Third, the residual may be computed based on the estimated flows to adjacent frames, and the pixels with a high residual may be marked as occluded. Fourth, the parameter of Gaussian noise on the residual in local windows with a predetermined size may be estimated. At each frame, what remains after taking out occlusions from the residual may be considered noise.

As shown in 504, the k-nearest neighbors within the same frame in a local window may be found for each patch at each frame. The size of the local window may be determined based on the local noise level or the gradient content. In one embodiment, a larger search window may be used for a larger noise level and more gradient content.

As shown in 506, for each pixel at each frame, for the patch around the pixel, all its nearest neighbor patches within the frame may be gathered. Additionally, the set with the nearest neighbors of the other patches at other frames that are matched to the original patch via optical flow may be expanded. Occlusions may be taken into account: in case a pixel is occluded at another frame, the neighbor patches from that frame may be ignored.

As shown in 508, for each color channel at each frame and for each pixel, the values of the center pixels of all the patches gathered in 506 may be averaged. When averaging the values, each pixel value may be weighted with the similarity of its patch to the original one. In aggregating the optical flows between frames to find the optical flow, the parameter σ used to compute the weights may adapted locally.

As shown in 510, once all the frames are denoised using the operations shown in 502 through 510, it may be determined whether a solution has been reached. Any suitable technique may be used for determining whether the solution has been reached, such as a determination of the convergence of the solution. If the current solution is significantly different from the previous solution, then a solution has not been reached, and the operations shown in 502 through 510 may be performed again using the denoised sequence as input. On the other hand, if the current solution is not significantly different from the previous solution, then the current solution may be output as the final result. In this manner, an iterative approach may be used for removing noise from the image sequence.

Figure 6:
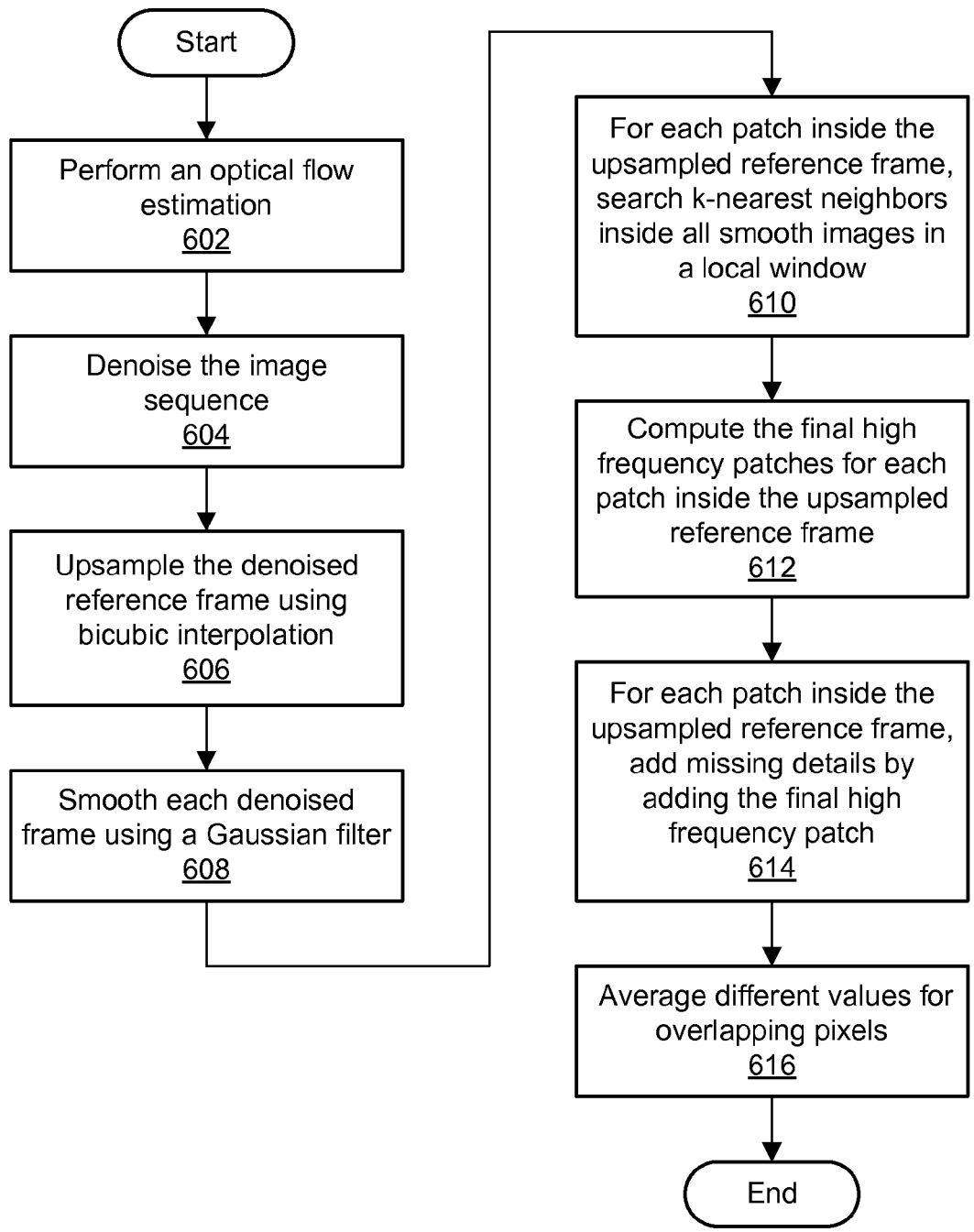
FIG. 6 is a flowchart illustrating further aspects of a method for upscaling and denoising an image sequence, according to one embodiment.

FIG. 6 is a flowchart illustrating further aspects of a method for upscaling and denoising an image sequence, according to one embodiment. The method shown in FIG. 6 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

The method illustrated in FIG. 6 may be used to perform video denoising and super-resolution for an image sequence with frames 1 . . . T. As shown in 602, an optical flow estimation may be performed. In one embodiment, the optical flow estimation may be performed using the following four steps. First, for each frame 2 . . . T−1, the optical flow may be estimated for the forward (t to t+1) and backward (t to t−1) optical flows. Second, the optical flows may be aggregated between frames to find the optical flow from any frame t to another one t'. Third, the residual may be computed based on the estimated flows to adjacent frames, and the pixels with a high residual may be marked as occluded. Fourth, the parameter of Gaussian noise on the residual in local windows with a predetermined size may be estimated. At each frame, what remains after taking out occlusions from the residual may be considered noise.

As shown in 604, the image sequence may be denoised. In one embodiment, the entire image sequence may be denoised using the operations shown in 504 through 510 of FIG. 5 and using the optical flow determined in 602. In another embodiment, only the reference frame may be denoised, and a robust norm such as truncated-$L_2$, Huber-$L_1$, or $L_1$-norm may be used for the k-nearest neighbor search (e.g., as previously illustrated in 508). In yet another embodiment, the operation shown in 604 may be avoided, e.g., if the image sequence is not sufficiently noisy. However, for the sake of example, it may assumed that the entire sequence is denoised prior to performing the following operations.

As shown in 606, the denoised reference frame is upsampled with bicubic interpolation (i.e., to create $L_1$). As shown in 608, each denoised frame may be smoothed with a Gaussian filter (i.e., to create $\{L_0\}$ image sequence). If only the reference frame has been denoised, then the denoised version of the reference frame may be smoothed along with the original versions of the other frames.

As shown in 610, for each patch inside $L_1$, a search for k-nearest neighbors inside all smooth images $\{L_0\}$ in a local window may be performed. The location of the local windows at other frames may be determined via optical flow. Occlusions may be considered: in case a patch is occluded at another frame, then a search for the nearest neighbors may be skipped at that location. If only the reference frame is denoised, then a robust norm such as truncated-$L_2$, Huber-$L_1$, or $L_1$-norm may be used to compute the distance between patches. Otherwise, a norm such as $L_2$-norm may be used.

As shown in 612, the final high frequency patches may be computed for each patch inside $L_1$. For each nearest neighbor, the patch inside $L_0$ may be subtracted from the patch inside original frame $I_0$ (not denoised $I_0$) to its high-frequency patch. All the high frequency patches may be averaged to get a single high-frequency patch to add back. When averaging the values, each patch may be weighted with the similarity of its patch from $L_0$ to the one in $L_1$.

As shown in 614, for each patch inside $L_1$, the final high frequency patch may be added on top to add missing details. As shown in 616, due to overlaps between nearby patches, different values for overlapping pixels may be averaged together.

When the input sequence is significantly noisy, the query patches may be considered unreliable for performing a search across the other frames. If standard, off-the-shelf video denoising tools were to be used prior to the super-resolution step, the denoising tools might remove the high-frequency elements that are required for the example-based super-resolution techniques described herein. Therefore, in one embodiment, denoised frames may be used only to construct the base image $L_0$ and to do k-NN search. However, the high-resolution patches may be extracted from the original frames and not the denoised ones.

To denoise the image sequence, a non-local-means-based method may be used. The query patch set may be enriched by adding new query patches from other frames that are matched to the original patch via optical flow. Additionally, a patch-match may be used to search an entire image for similar patches. In one embodiment, an exact k-NN search may be performed in a local window with occlusions considered to eliminate spurious query patches.

Given a single input image $I_0: \Lambda_0 \to \mathbb{R}+$, where $\Lambda_0 \subset \mathbb{R}^2$ is a M×N grid, example-based super-resolution methods may first upsample the input image by a scale factor s and get a blurry image $L_1$ on sM×sN grid $\Lambda_1$, where it is given by $L_1(x)=I_0(x/s)$. Since $I_0$ is defined on the discrete grid $\Lambda_0$, linear or bicubic interpolation may be used to upsample the image, and these methods may produce a blurry image. The lost image details may then be recovered for each patch in $L_1$ using either an external database or self-similar examples from the same image containing high and low resolution patch pairs.

To gather self-similar examples, one approach first convolves $I_0$ with a Gaussian kernel $G_\sigma$ to reach the smooth image $L_0=G_\sigma*I_0$. The smooth image $L_0$ is the counterpart of $L_1$. For each m×m patch in $L_1$ which is located around x, this approach exhaustively searches for the most similar q×q patch inside $L_0$ in a search window $W_{x/s}^r$ given by:

$$W_x^r = \{z | \|z-x\|_\infty \le r\} \quad (1)$$

with predetermined radius r. To find the closest patch inside $W_x^r$, the sum of squared error (SSE) distance between patches may be used. Once the closest patch at location x' is found in $L_0$, the patch at the same location in $I_0$ is extracted, and the difference between them is taken to find the missing high frequency elements in original patch in $L_1$. Finally, the missing elements are added back to the original patch to construct the high-resolution one. Defining $R_x$ as an operator that extracts a q×q patch from an image at location (i, j), this step can be expressed as:

$$R_x I_1 = R_x L_1 + R_{x'}(I_0 - L_0) \quad (2)$$

where $I_1$ is the high-resolution image. Due to overlaps between nearby patches, different values for overlapping pixels are averaged together.

Even though local image structures tend to repeat themselves within and across different image scales in a single image—in other words, an image often possesses a great amount of local self-similarity—it may be limiting to rely on a single frame for the super-resolution task, and its effectiveness may deteriorate in the presence of significant noise. Therefore, multiple frames may be combined to upscale a single reference frame.

Often, the patches in an image sequence not only repeat within their own frames but also persistently recur at the other frames unless they are occluded or carried out of the camera view. However, to use this additional information, a correspondence between the reference frame and the other frames may be established, since ego- or scene motion inevitably induces a deformation on the image domain. In one embodiment, this deformation can be captured through optical flow estimation. Let $\{I_0^t\}_t^T$ be an image sequence and $I_0^{ref}$ be the frame that will be upscaled. Under the constant illumination and Lambertian reflection assumptions, the relations between the reference frame and the others are given by:

$$I_0^{ref}(x) = I_0^t(x+v^t(x)) + n^t(x), x \in \Lambda_0 \backslash \Omega^t \quad (3)$$

where $v^t: \Lambda_0 \backslash \Omega \to \mathbb{R}^2$ is the optical flow mapping $I_0^{ref}$ onto $I_0^t$ everywhere except occluded regions $\Omega^t$, and quantization error and sensor noise are included into $n^t$. The flow field $v^t$ is not defined in $\Omega^t$, since the occluded parts are not visible in $I_0^t$, and therefore those portions are not put into correspondence. While flow field $v^t$ defines how the recurring patches in $I^t$ may be reached, $\Omega^t$ is also critical as it determines whether a patch in $I_0^{ref}$ appears again in $I_0^t$ or not. Therefore, both $v^t$ and $\Omega^t$ may be computed. Sn estimate of the flow field $v^t$ in the co-visible region $\Lambda_0 \backslash \Omega^t$, as well as an estimate of the occluded region $\Omega^t$, may be provided. Optical flow estimation methods that do not mark occluded regions may also be used. Once the optical flow $v^t$ is estimated in such a framework, the residual $|I_0^{ref}(x) - I_0^t(x + v^t(x))|$ may be thresholded to get an occlusion map $\Omega^t$. Another solution may involve checking the inconsistencies between the backward-forward flow estimations, assuming that the inverse of the optical flow function $v^t$ exists away from occlusions. From this point on, therefore, it may be assumed that both entities are given for each time instant t.

Figure 7:
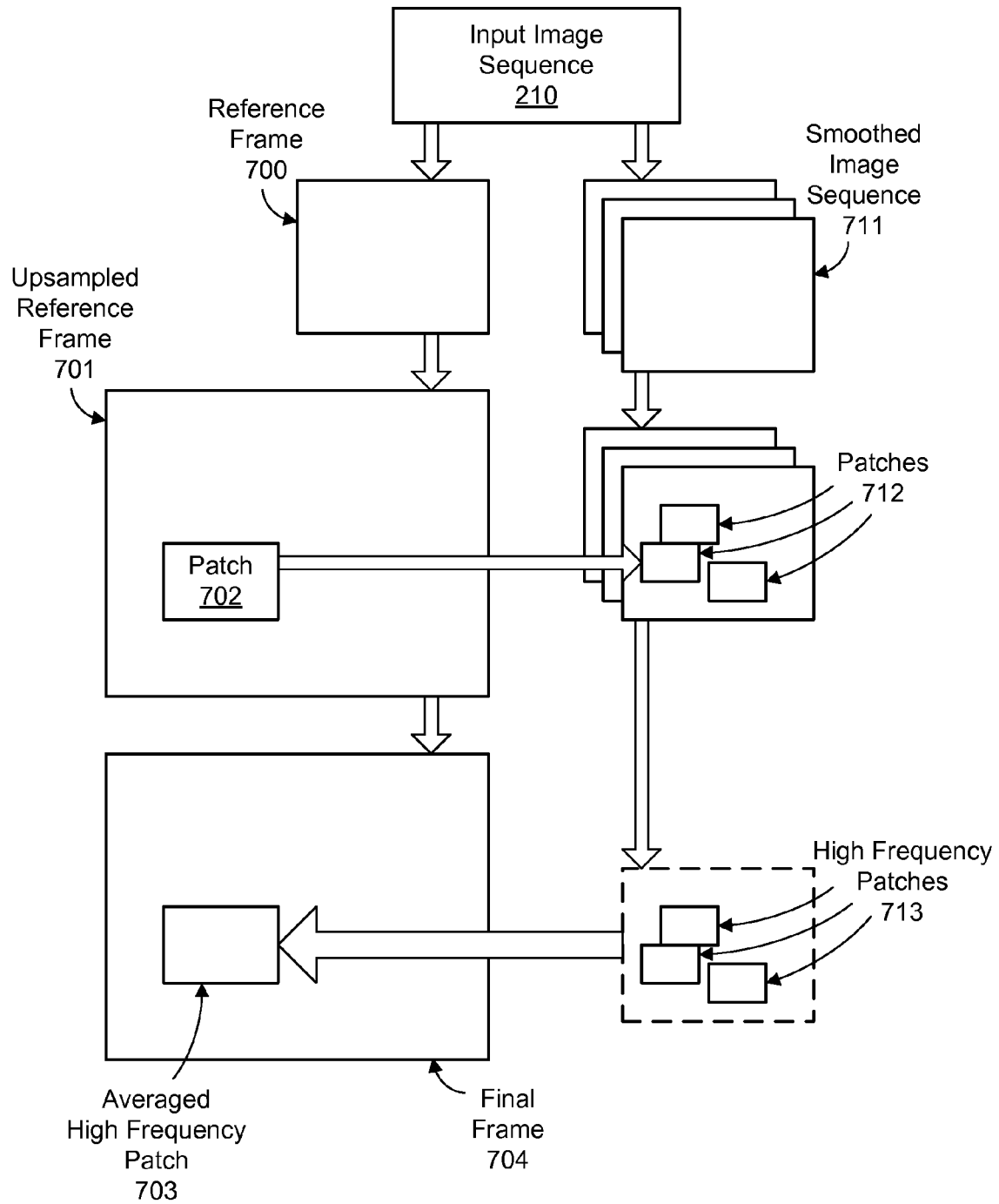
FIG. 7 illustrates a process for upscaling an image sequence, according to one embodiment.

FIG. 7 illustrates a process for upscaling an image sequence, according to one embodiment. For purposes of example, FIG. 7 illustrates the upscaling of a single reference frame 700 in an input image sequence 210. However, upscaling may be performed for each frame in the input image sequence 210 or for some smaller subset of frames. To upscale the reference frame $I_0^{ref}$, $I_0^{ref}$ may first be upsampled with bicubic interpolation to produce an upsampled reference frame 701, denoted as $L_1^{ref}$. $L_1^{ref}$ lacks high frequency elements. To recover such elements, similar patches may be found inside the smoothed image sequence 711, denoted as $\{L_0^t\}_{t=1}^T$, where $L_0^t = G_\sigma * I_0^t$ at time instance t. However, to initiate a search, the flow field sequence $\{v^t\}_{t=1}^T$ may be computed to find the location of search windows. For each patch 702 located around x, the nearest neighbors inside the window $W_{x/s+v^t(x/s)}$ on $L_0^t$ may be determined. The set of patch pairs may also be expanded by searching for K nearest neighbors instead of a single one. Once this step is repeated for all the frames, a set of similar patch locations 712, denoted as $\{(x')_t^k\}_{t=1,k=1}^{T,K}$, may be obtained for each site $x \in \Lambda_1$. In contrast to single image upscaling, multiple candidates may exist for recovery of missing details. In one embodiment, the high frequency elements 713 in the candidates may be averaged to combine the information. When computing the average high-frequency patch 703, each candidate patch may be weighted with respect to its similarity to the original one in $L_1^{ref}$. The average patch 703 may be added back to the original patch 702 as:

$$R_x I_1^{ref} = R_x L_1^{ref} + \frac{1}{Z} \sum_{t=1}^{T} \sum_{k=1}^{K} w(x, (x')_t^k)\left[R_{(x')_t^k}(I_0^t - L_0^t)\right] \quad (4)$$

where Z is the normalizing factor given by $$\sum_{k=1}^{K} \sum_{t=1}^{T} w(x, (x')_t^k),$$

and where the weights w are computed as:

$$w(x, (x')_t^k) = \exp\left(-\frac{\|R_x L_1^{ref} - R_{(x')_t^k} L_0^t\|_2^2}{2\sigma_{n^t}^2}\right), x \in \Lambda_0 \backslash \Omega_t \quad (5)$$

$$w(x, (x')_t^k) = 0, x \in \Omega_t$$

where $\sigma_{n^t}$ is the variance of the noise $n^t$ at frame t. The zero-weights may prevent getting any sample patch from the frames where the original patch is occluded. Similar to the single image case, due to overlaps between nearby patches, the nearby patches may be averaged to construct the final image 704, denoted as $L_t^{ref}$.

However, when the input sequence is significantly noisy, the query patches may not be a reliable basis for performing a search across the other frames. If an off-the-shelf video denoising tool were used to denoise the sequence prior to the super-resolution step, the output image sequences would typically be blurred and lacking the critical high-frequency elements which may be required for an example-based super-resolution algorithm to succeed. Therefore, denoised video sequences may be used to construct the upsampled base image $L_t^{ref}$ and smooth frames $\{L_0^t\}_{t=1}^T$ for the k-NN search. Once the candidate location of the similar low-resolution patches is found, the high-resolution images are extracted from the original frames rather than from the denoised ones. To denoise the image sequence, a non-local-means-based method may be used. Similar to the super-resolution technique described herein, denoising schemes may rely on significant self-similarity existing in natural images.

Figure 8:
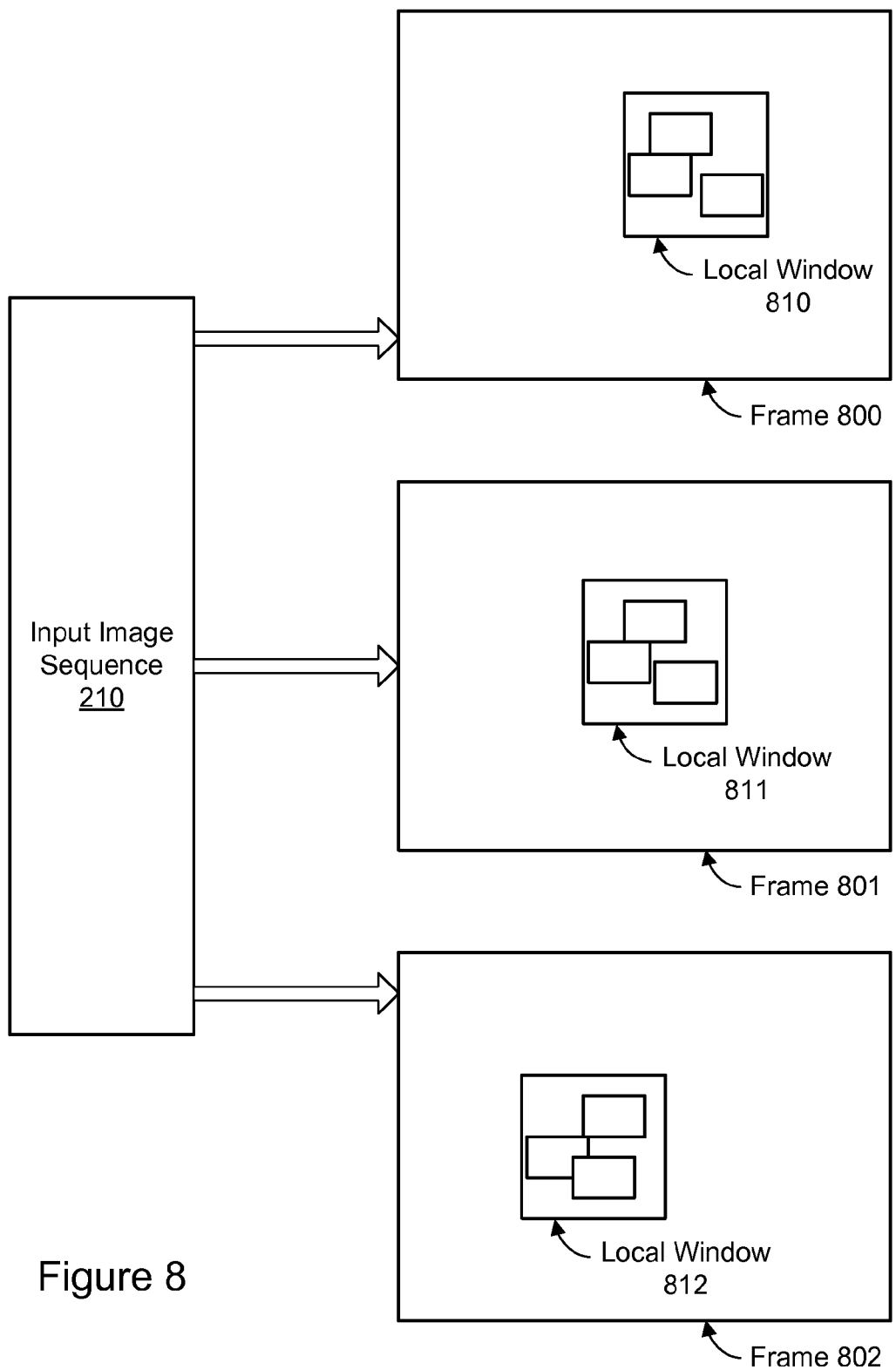
FIG. 8 illustrates a process for denoising an image sequence with non-local means, according to one embodiment.

FIG. 8 illustrates a process for denoising an image sequence with non-local means, according to one embodiment. Using the techniques described herein, the search window may be limited to a local one, and an exact k-nearest neighbor search may be used to prevent any error introduced by an approximate search. As shown for purposes of example of FIG. 8, a local search window 810, 811, and 812 is used in each respective frame of neighboring frames 800, 801, and 802. Furthermore, occlusions may be taken into account to eliminate the effect of spurious query patches. Using the notation that $\{(x')_t^k\}_{t=1,k=1}^{T,K}$ is the set of patch locations found with the search scheme described above, the denoised image $\tilde{I}_0^{ref}$ is given by:

$$\tilde{I}_0^{ref}(x) = \frac{1}{Z} \sum_{t=1}^{T} \sum_{k=1}^{K} w(x, (x')_t^k) I_0^t((x')_t^k). \quad (6)$$

The denoising step may be extended to the other frames.

In one embodiment, to upscale the noisy frame $I_0^{ref}$, the input sequence $\{I_0^t\}_{t=1}^T$ is first denoised to construct the sequence $\{\tilde{I}_0^t\}_{t=1}^T$. Second, the denoised reference frame $\tilde{I}_0^{ref}$ is upsampled with bicubic interpolation to create the base frame $\tilde{L}_0^{ref}$. Third, the denoised video sequence is further smoothed, and the blurred sequence $\{\tilde{L}_0^t\}_{t=1}^T$ is constructed, where $\tilde{L}_0^t = G_\sigma * \tilde{I}_0^t$. Fourth, for each patch in $\tilde{L}_1^{ref}$, k-NN queries at other blurry denoised frames $\{\tilde{L}_0^t\}_{t=1}^T$ are performed to find the similar patches located at $\{(x')_t^k\}_{t=1,k=1}^{T,K}$. Finally, the resolution of each patch is increased by adding back the high-frequency elements gathered from the original images. This step can be written as:

$$R_x I_1^{ref} = R_x \tilde{L}_1^{ref} + \frac{1}{Z} \sum_{t=1}^{T} \sum_{k=1}^{K} w(x, (x')_t^k)\left[R_{(x')_t^k}(I_0^t - \tilde{L}_0^t)\right]. \quad (7)$$

In one embodiment, it is also possible to upscale the noisy frame $I_0^{ref}$ without denoising the whole sequence. Denoised $\tilde{L}_1^{ref}$ may be used as the base image, and the noisy smooth images $\{L_0^t\}_{t-1}^T$ may be searched for similar patches. However, to suppress the effect of the noise on the similarity scores, a robust norm such as truncated-$L_2$, Huber-$L_1$, or $L_1$-norm may be used. The high frequency patches may be constructed with a slight difference from equation 7 as:

$$R_x I_1^{ref} = R_x \tilde{L}_1^{ref} + \frac{1}{Z} \sum_{t=1}^{T} \sum_{k=1}^{K} w(x, (x')_t^k) [R_{(x')_t^k} (I_0^t - L_0^t)]. \quad (8)$$

In one embodiment, although pixel-level alignment may be assured with exact k-NN search, subpixel alignment may improve the quality of the high-resolution output. In addition to subpixel alignment, because high-frequency elements are sparse in natural images, a sparsity constraint may be enforced. The sparsity term may be especially effective in the presence of noise. Even though the averaging process in equation 7 reduces the effect of noise significantly, the sparsity term removes the residual noise. Incorporating these two approaches, an estimation of the high-frequency elements $H_1$ may be expressed as a minimization problem such that:

$$\hat{H}_1, \quad (9)$$

$$\{\hat{u}_k^t\} = \underset{H_1, \{u_k^t\}}{\operatorname{argmin}} \sum_{x \in \Lambda_1} \sum_{t=1}^{T} \sum_{k=1}^{K} \left\| R_x H_1 - R_{(x')_t^k + u_k^t(x)} (I_0^t - \tilde{L}_0^t) \right\|_{L2}^2 + \lambda \|H_1\|_{L1}$$

where $u_k^t: \Lambda_1 \rightarrow \mathbb{R}^2$ indicates the subpixel alignments for the $k^{th}$ similar patches sampled from frame t.

Without subpixel alignment and the sparsity term, the solution of the minimization problem may be obtained using equation 7. In one embodiment, the following steps may be used to solve the equation. The high-frequency patches $\{R_x H_1^{ref}\}_{x \in \Lambda_1}$ may be estimated with the averaging term in equation 7. The high-frequency elements at the locations that the patches overlap may be averaged. A shrinkage formulation (e.g., soft-thresholding) may be applied to enforce sparsity on $H_1$. An optical flow estimation may be applied at each pixel location to estimate the sub-pixel alignment $u_k^t(x)$. Once the $\hat{H}_1$ is estimated, it can be added to the base image to compute the high-resolution image:

$$I_1^{ref} = \tilde{L}_1^{ref} + \hat{H}_1. \quad (10)$$

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
denoising an original image sequence to generate a denoised image sequence;
generating an upsampled frame based on a denoised frame in the denoised image sequence, the original image sequence comprising a plurality of frames;
generating a smoothed image sequence based on the denoised image sequence;
determining a plurality of patches in the upsampled frame that is based on the denoised frame, each of the plurality of patches comprising a subset of image data in the upsampled frame;
determining locations of a plurality of corresponding patches in a neighboring set of the plurality of frames in the smoothed image sequence that is based on the denoised image sequence, the neighboring set of the plurality of frames being determined from frames within a threshold number of frames before or after the upsampled frame;
generating a plurality of high-frequency patches, each high-frequency patch being based on image data at the locations of the plurality of corresponding patches in the original image sequence, the locations derived from the corresponding patches in the denoised image sequence; and
adding the plurality of high-frequency patches to the upsampled frame.

2. The method as recited in claim 1, further comprising:
determining an optical flow in the original image sequence;
wherein the locations of the plurality of corresponding patches are determined based on the optical flow.

3. The method as recited in claim 1, wherein determining the locations of the plurality of corresponding patches comprises searching a local window in each of the neighboring set of the plurality of frames in the smoothed image sequence.

4. The method as recited in claim 1, wherein determining the locations of the plurality of corresponding patches comprises excluding a patch comprising an occluded pixel.

5. The method as recited in claim 1, wherein the locations of the plurality of corresponding patches are determined based on an occlusion map.

6. The method as recited in claim 1, wherein adding the plurality of high-frequency patches to the upsampled frame comprises averaging values for overlapping pixels.

7. A system, comprising:
at least one processor; and
a memory coupled to the at least one processor, the memory storing program instructions that are executable by the at least one processor to perform operations comprising to:
denoise an original image sequence to generate a denoised image sequence;
generate an upsampled frame based on a denoised frame in the denoised image sequence, the original image sequence comprising a plurality of frames;
generate a smoothed image sequence based on the denoised image sequence;
determine a plurality of patches in the upsampled frame that is based on the denoised frame, each of the plurality of patches comprising a subset of image data in the upsampled frame;
determine locations of a plurality of corresponding patches in a neighboring set of the plurality of frames in the smoothed image sequence that is based on the denoised image sequence, the neighboring set of the plurality of frames being determined from frames within a threshold number of frames before or after the upsampled frame;
generate a plurality of high-frequency patches, each high-frequency patch being based on image data at the locations of the plurality of corresponding patches in the original image sequence, the locations derived from the corresponding patches in the denoised image sequence; and
add the plurality of high-frequency patches to the upsampled frame.

8. The system as recited in claim 7, wherein the program instructions are executable by the at least one processor to:
determine an optical flow in the original image sequence;
wherein the locations of the plurality of corresponding patches are determined based on the optical flow.

9. The system as recited in claim 7, wherein to determine the locations of the plurality of corresponding patches, the program instructions are executable by the at least one processor to search a local window in each of the neighboring set of the plurality of frames in the smoothed image sequence.

10. The system as recited in claim 7, wherein to determine the locations of the plurality of corresponding patches, the program instructions are executable by the at least one processor to exclude a patch comprising an occluded pixel.

11. The system as recited in claim 7, wherein the locations of the plurality of corresponding patches are determined based on an occlusion map.

12. The system as recited in claim 7, wherein to add the plurality of high-frequency patches to the upsampled frame, the program instructions are executable by the at least one processor to average values for overlapping pixels.

13. A computer-readable storage memory device storing program instructions that are computer-executable to perform operations comprising:
denoising an original image sequence to generate a denoised image sequence;
generating an upsampled frame based on a denoised frame in the denoised image sequence, the original image sequence comprising a plurality of frames;
generating a smoothed image sequence based on the denoised image sequence;
determining a plurality of patches in the upsampled frame that is based on the denoised frame, each of the plurality of patches comprising a subset of image data in the upsampled frame;
determining locations of a plurality of corresponding patches in a neighboring set of the plurality of frames in the smoothed image sequence that is based on the denoised image sequence, the neighboring set of the plurality of frames being determined from frames within a threshold number of frames before or after the upsampled frame;
generating a plurality of high-frequency patches, each high-frequency patch being based on image data at the locations of the plurality of corresponding patches in the original image sequence, the locations derived from the corresponding patches in the denoised image sequence; and
adding the plurality of high-frequency patches to the upsampled frame.

14. The computer-readable storage memory device as recited in claim 13, further comprising:
determining an optical flow in the original image sequence;
wherein the locations of the plurality of corresponding patches are determined based on the optical flow.

15. The computer-readable storage memory device as recited in claim 13, wherein determining the locations of the plurality of corresponding patches comprises searching a local window in each of the neighboring set of the plurality of frames in the smoothed image sequence.

16. The computer-readable storage memory device as recited in claim 13, wherein determining the locations of the plurality of corresponding patches comprises excluding a patch comprising an occluded pixel.

17. The computer-readable storage memory device as recited in claim 13, wherein adding the plurality of high-frequency patches to the upsampled frame comprises averaging values for overlapping pixels.

18. The method as recited in claim 1, further comprising:
forming averaged high-frequency patches by performing weighted averages of at least some of the plurality of high-frequency patches with weights in the weighted averages being determined from similarities of the at least some of the plurality of high frequency patches to at least one of the corresponding patches in the original image sequence.

19. The system as recited in claim 7, wherein the program instructions are executable by the at least one processor to:
form averaged high-frequency patches by performing weighted averages of at least some of the plurality of high-frequency patches with weights in the weighted averages being determined from similarities of the at least some of the plurality of high frequency patches to at least one of the corresponding patches in the original image sequence.

20. The computer-readable storage memory device as recited in claim 13, further comprising:
forming averaged high-frequency patches by performing weighted averages of at least some of the plurality of high-frequency patches with weights in the weighted averages being determined from similarities of the at least some of the plurality of high frequency patches to at least one of the corresponding patches in the original image sequence.

* * * * *